United States Patent
Mühe (10) Patent No.: US 7,504,175 B2
(45) Date of Patent: Mar. 17, 2009

(54) BATTERY HAVING A COVER AND A DEGASSING CHANNEL SYSTEM SEALED WITH ANNULAR PROJECTIONS AND SEALING ELEMENTS

(75) Inventor: Hans Mühe, Hildesheim (DE)

(73) Assignee: VB Autobatterie GmbH & Co. KGAA (DE)

( * ) Notice: Subject to any disclaimer, the term of this patent is extended or adjusted under 35 U.S.C. 154(b) by 0 days.

(21) Appl. No.: 11/880,873

(22) Filed: Jul. 24, 2007

(65) Prior Publication Data

US 2008/0032186 A1 Feb. 7, 2008

Related U.S. Application Data

(63) Continuation of application No. PCT/DE2006/000761, filed on May 3, 2006.

(30) Foreign Application Priority Data

May 10, 2005 (DE) .................... 10 2005 021 421

(51) Int. Cl.
*H01M 2/12* (2006.01)
*H01M 2/00* (2006.01)
(52) U.S. Cl. .................... 429/82; 429/72; 429/87; 429/88; 429/89; 429/163
(58) Field of Classification Search .................... 429/53, 429/72, 82, 87, 89, 151, 171
See application file for complete search history.

(56) References Cited

U.S. PATENT DOCUMENTS 3,597,280 A 8/1971 Hennen 3,900,999 A * 8/1975 Callan .................... 52/42.15
4,214,045 A * 7/1980 Jutte et al. .................... 429/87

(Continued)

FOREIGN PATENT DOCUMENTS

DE 1 901 356 12/1970

(Continued)

OTHER PUBLICATIONS

International Search Report and Written Opinion for International Application No. PCT/DE2006/000761; mailed May 8, 2008; 9 pages.

(Continued)

*Primary Examiner*—Dah-Wei D Yuan
*Assistant Examiner*—Kwang Han
(74) *Attorney, Agent, or Firm*—Foley & Lardner LLP (57) ABSTRACT

A battery includes a housing having a plurality of cell vessels and a plurality of positive and negative electrode plates provided within the cell vessels. The battery also includes a lower cover configured to close the cell vessels with a seal, the lower cover having openings for the cell vessels. The battery further includes a degassing channel system which is coupled to the lower cover by at least one member, the openings of the lower cover opening into the degassing channel system. Annular projections are integrally formed on each of the openings of the lower cover adjacent to the lower cover, and the at least one member is configured to couple the degassing channel system to the lower cover such that the projections seal the openings to the degassing channel system by surface pressure.

12 Claims, 5 Drawing Sheets

U.S. PATENT DOCUMENTS

| | | | |
|---|---|---|---|
| 4,286,028 A | * | 8/1981 | Heiser et al. .................. 429/82 |
| 4,348,466 A | | 9/1982 | Elehew et al. |
| 4,752,545 A | * | 6/1988 | Brecht et al. ................ 429/181 |
| 6,461,758 B1 | * | 10/2002 | Geibl et al. .................. 429/72 |

FOREIGN PATENT DOCUMENTS

| | | |
|---|---|---|
| EP | 1 017 119 A1 | 7/2000 |
| EP | 1 098 377 A1 | 5/2001 |
| EP | 1 156 538 A2 | 11/2001 |
| GB | 2156574 A * | 10/1985 |

OTHER PUBLICATIONS

Search Report for International Application No. PCT/DE2006/000761; mailed May 8, 2008; 4 pages.

International Preliminary Report on Patentability and Written Opinion of the International Searching Authority for International Application No. PCT/DE2006/000761; mailing date Jul. 17, 2008; 6 pages.

* cited by examiner

Fig. 10

BATTERY HAVING A COVER AND A DEGASSING CHANNEL SYSTEM SEALED WITH ANNULAR PROJECTIONS AND SEALING ELEMENTS

CROSS-REFERENCE TO RELATED PATENT APPLICATIONS

The present application is a Continuation of International Application No. PCT/DE2006/000761 filed May 3, 2006, which claims the benefit of German Priority Application No. DE 10 2005 021 421.5 filed May 10, 2005. The disclosures of International Application No. PCT/DE2006/000761 and German Priority Application No. DE 10 2005 021 421.5 are incorporated herein by reference in their entireties.

BACKGROUND

The present invention relates to accumulators or batteries (i.e., lead-acid starting, lighting, and ignition batteries), and more particularly to the construction of such accumulators or batteries. For purposes of the present disclosure, the term "accumulator" and "battery" will be used interchangeably.

Gas is developed during operation of accumulators, and must be dissipated in the cell vessels. Upward openings are provided in the cell vessels for this purpose, and open into a degassing chamber system. The degassing chamber system branches off by means of a multiplicity of deflection webs so as to form a labyrinth for electrolyte liquid which can slosh into the cavity through the openings from the cell vessels. Electrolyte is also torn away in the gas flow and can strike the deflection webs, where it condenses. In this case, the degassing channel system is inclined such that the electrolyte liquid can flow back again into the cell vessel.

DE 1 901 356 discloses a multicell accumulator having a continuous covering strip which closes the filling openings and, when fitted, releases degassing openings for the individual cells. A movable tubular part is arranged in each filling opening, is moved in the direction of the cell interior when the covering strip is fitted, and releases at least one degassing opening. The movable tubular part latches in an upper limit position when the covering strip is lifted off, and in the process seals the degassing opening. The seal is in this case provided on conical sealing surfaces on the tubular section.

EP 1 017 119 A1 discloses an accumulator in which filling openings in a lower cover of a battery cell vessel are sealed by a degassing channel element which is fitted to the lower cover and has tubular pieces with degassing valves for insertion into the openings. The tubular pieces are locked by means of spring latching hooks, which lock with the opening wall in the cell interior. The opening is in this case sealed radially with the aid of a push fit of the tubular pieces which project into the openings.

U.S. Pat. No. 4,348,466 discloses an accumulator in which a gassing channel system is fitted to the lower cover, which has openings to the cell vessels. Once again, the tubular degassing valves which project into the opening are sealed radially, but with the aid of sealing rings which are circumferential on the outer wall of the tubular pieces.

U.S. Pat. No. 3,597,280 also discloses an accumulator with a degassing channel system fitted, in which the degassing channel system is plugged onto the cell vessels with the aid of valve plugs which project into the opening. The degassing channel system is sealed and fixed to the cell vessels by a push fit between the valve plugs and the openings. One problem with these conventional accumulators is the sealing of the openings in the lower cover to the degassing channel system, as a result of manufacturing tolerances.

SUMMARY

An exemplary embodiment of the invention relates to a battery that includes a housing having a plurality of cell vessels and a plurality of positive and negative electrode plates provided within the cell vessels. The battery also includes a lower cover configured to close the cell vessels with a seal, the lower cover having openings for the cell vessels. The battery further includes a degassing channel system which is coupled to the lower cover by at least one member, the openings of the lower cover opening into the degassing channel system. Annular projections are integrally formed on each of the openings of the lower cover adjacent to the lower cover, and the at least one member is configured to couple the degassing channel system to the lower cover such that the projections seal the openings to the degassing channel system by surface pressure.

BRIEF DESCRIPTION OF THE DRAWINGS

The invention will be explained in more detail in the following text with reference, by way of example, to the attached drawings, in which:

FIG. 9 shows a partial section view of a second embodiment of the accumulator with a degassing channel system clamped on;

FIG. 10 shows a partial section view of a third embodiment of the accumulator, with a degassing channel system clamped on.

DETAILED DESCRIPTION

According to an exemplary embodiment, an improved accumulator (e.g., in the form of lead-acid accumulators or batteries for use as motor vehicle starter batteries) includes a battery housing which is split into cell vessels, having a multiplicity of positive and negative electrode plates which are stacked alongside one another parallel to form electrode plate stacks and are separated from one another by separators, and have a lower cover which closes the cell vessels with a seal, with the lower cover having openings for the cell vessels and with the openings opening into a degassing channel system which is fitted to the lower cover. Such a configuration is intended to ensure that the subsequently fitted degassing channel system is seated securely and forming a seal.

According to an exemplary embodiment, annular projections are integrally formed on each opening adjacent to the lower cover, and the degassing channel system has attachment means in order to firmly clamp the degassing channel system on the lower cover such that the projections seal the openings to the degassing channel system by surface pressure.

In contrast to the conventional radial seal on the inner wall of the opening, it is proposed that the seal on the upper face of the lower cover be provided on the lower cover, circumferentially around the opening, with the aid of the surface pressure from the degassing channel system. Even if the sealing contact surfaces are shifted as a result of manufacturing tolerances, this ensures that the degassing channel system is always seated on the lower cover, forming a seal. In order to seal the opening by surface pressure, the annular projections on the lower cover are each provided adjacent to an opening, which ensure a sealed contact between the annular projection and the degassing channel system when the degassing channel system is clamped against the lower cover.

Seals which correspond to the projections are preferably provided on the degassing channel system. Alternatively or additionally, the seals may also be specific seals. The seals may in this case preferably be formed from a flexible material in order to be compressed when the degassing channel system is clamped onto the lower cover, forming a seal in the process. It is particularly advantageous for the seals to be molded onto the material of the lower cover or upper cover using a two-component process.

The degassing channel system preferably has a cavity between a base and the upper cover, and deflection webs extending between the base and the upper cover, in order to form the channel system.

In one preferred embodiment, members or elements in the form of spring snap-action hooks are provided on the base of the degassing channel system in order to engage in respective openings in the lower cover and these spring snap-action hooks extend away downwards from the cavity. The snap-action spring hooks in this case have lengths which are designed precisely such that when the degassing channel system is fitted onto the lower cover, the spring snap-action hooks which project into the openings, lock with the lower cover and ensure surface pressure which is sufficient to seal the opening. The bracing of the degassing channel system in the area of the openings against the lower cover advantageously ensures surface pressure in the area of the openings, which surface pressure is independent of the stiffness of the degassing channel system and of the lower cover.

The openings in the lower cover preferably have tubular connecting studs which project inwards into the cell vessels. These have the advantage that, particularly in conjunction with the spring snap-action hooks, they make it easier to fit the degassing channel system to the lower cover and to brace the spring snap-action hooks against the lower ends of the tubular connecting studs.

It is also particularly advantageous for walls which extend away upwards from the cell vessels and have locking tabs and/or latching grooves to be provided on the lower cover. In this case, the degassing channel system has spring snap-action hooks and/or guide tabs which correspond respectively with the locking tabs and latching grooves, in order to clamp the degassing channel system against the lower cover, and to fix it there.

Figure 1:
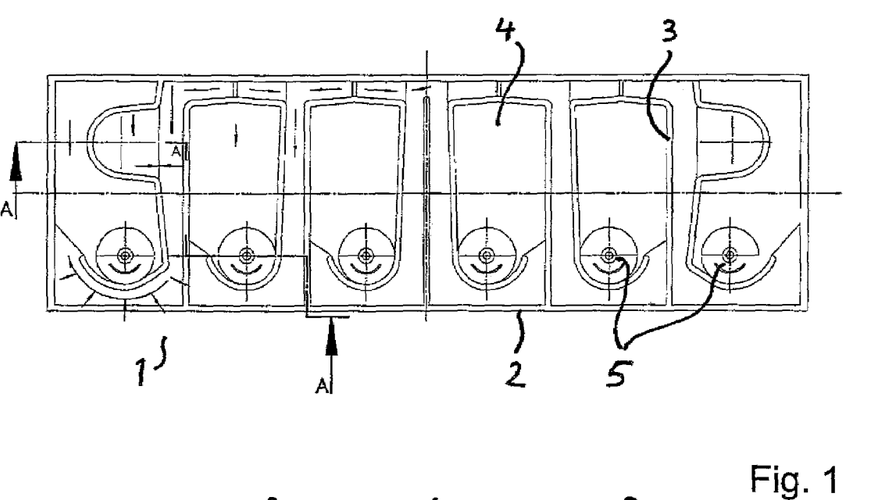
FIG. 1 shows a plan view of a degassing system having deflection webs which form a labyrinth.

FIG. 1 shows a section view of a degassing channel system 1, in the form of a plan view. The rectangular degassing channel system 1 has circumferential outer walls 2 on the external circumference, as well as a multiplicity of deflection webs 3 which extend upwards to an upper cover from the base 4 of the degassing channel system 1. The deflection webs 3 are used to retain electrolyte in all inclined and tilted positions of the accumulator when electrolyte sloshes through degassing openings 5 into the cavity in the degassing channel system 1. This is sketched by way of example by the arrows.

Figure 2:
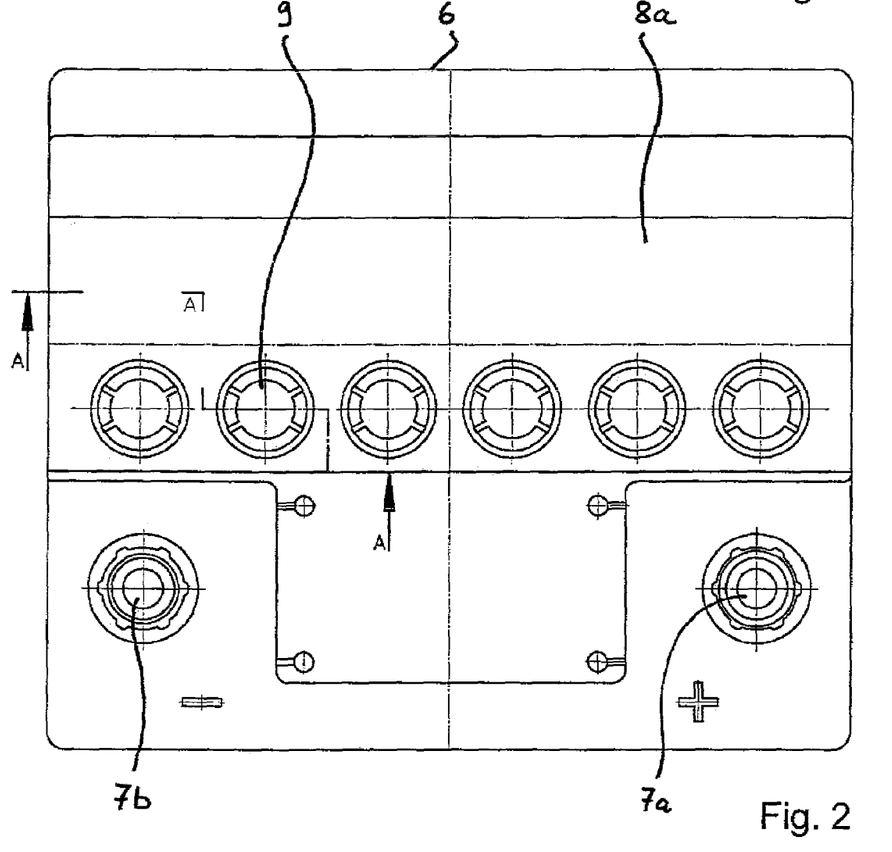
FIG. 2 shows a plan view of a lead-acid accumulator having six openings, which each open into one cell vessel, without a degassing channel system.

FIG. 2 shows a plan view of an accumulator 6 with a positive and a negative pole 7a, 7b for electrical connection. The accumulator 6 is subdivided into six cell vessels. Openings 9 which open into the cell vessels are provided in the upper cover 8a of the accumulator 6. One opening 9 is provided for each cell vessel in the illustrated exemplary embodiment. However, alternative embodiments are also feasible in which two, three or more openings are provided for each cell vessel. In particular, an embodiment is feasible in which filling and monitoring openings which can be closed by plugs are provided separately from degassing openings.

Provision is made in the case of the accumulator for the separate degassing channel system (1) to be plugged onto the upper cover 8a of the accumulator 6, and to seal the openings 9 in the process.

Figure 3:
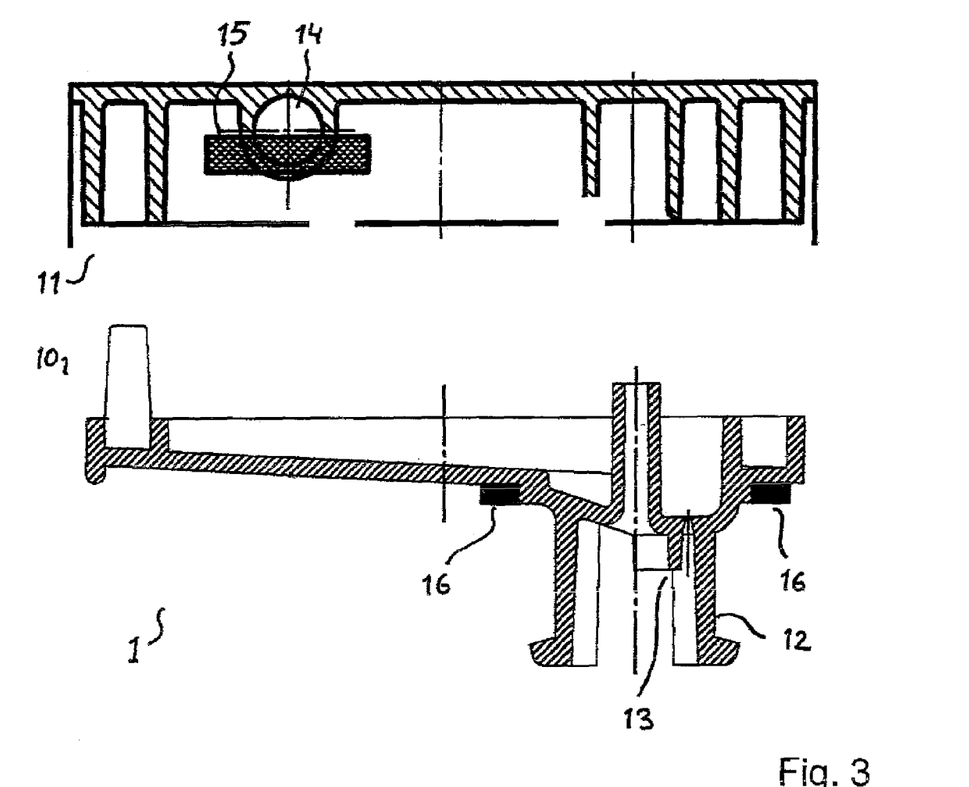
FIG. 3 shows a cross-sectional exploded view of the degassing channel system shown in FIG. 1.

FIG. 3 shows a cross-sectional view of the degassing channel system 1, which is composed of a lower part 10 and an upper part 11. The upper part 11 is in this case welded to the lower part 10, or is clamped in some other manner to form a seal. Members or elements in the form of spring snap-action hooks 12 extend downwards from the lower part 10. These are arranged and aligned such that they project into a respectively associated opening 9, where they are locked to the lower cover 8b of the accumulator 6. The spring snap-action hooks 12 are in the form of a cylindrical tubular piece for each opening 9, or are formed from a plurality of spring snap-action hooks 12 arranged at a distance from one another on a circular path.

As can also be seen, a degassing valve 13 comprising a first tubular piece which projects downwards in the direction of the cell vessels and a second tubular piece which projects upwards in the direction of the upper part 11 is provided in the degassing opening that is surrounded by the spring snap-action hooks 12. The degassing valve 13 allows gas to emerge even when electrolyte which has emerged into the degassing channel system 1 flows back through the return opening into the cell.

Furthermore, a gas dissipation channel 14 is sketched (see, e.g., FIGS. 3 and 6), through which the gas is passed outwards into the environment by an ignition protection element 15.

As can also be seen from FIG. 3, an annular sealing element 16 which surrounds the spring snap-action hooks 12 is provided for each opening on the lower face of the degassing channel system 1.

Figure 4:
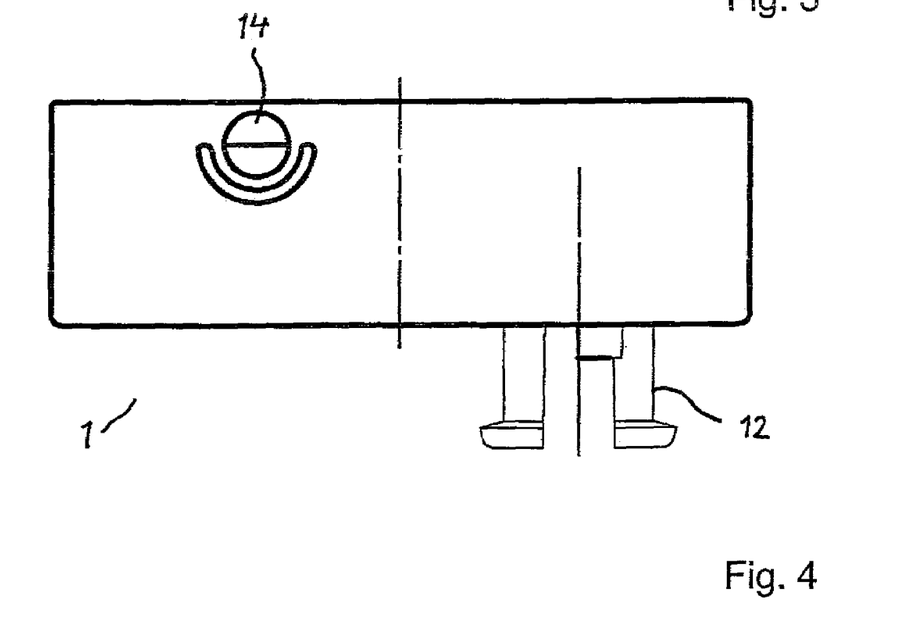
FIG. 4 shows a side view of the degassing channel system shown in FIG. 1.

FIG. 4 once again shows a side view, not cut open, of the degassing channel system 1.

Figure 5:
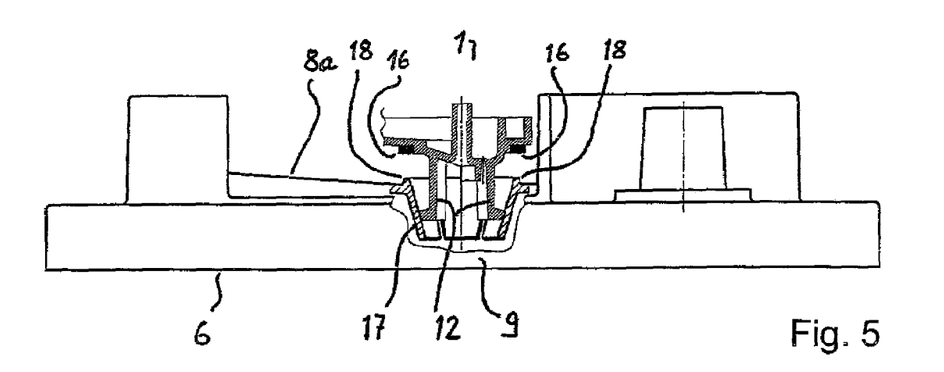
FIG. 5 shows a section view of the lower cover of the lead-acid accumulator shown in FIG. 2, with a degassing channel system fitted.

As can be seen from FIG. 5, the degassing channel system 1 is plugged onto the lower cover 8b of the accumulator 6 such that the spring snap-action hooks 12 project into the openings 9. The openings 9 have a tubular piece 17, which projects downwards into the respective cell vessel, and a projection 18 in the form of a bead on the upper face of the lower cover 8b. The projection 18 which is in the form of a bead surrounds the opening 9 completely, and seals the opening 9 externally when the degassing channel system 1 is clamped onto the lower cover 8b with the aid of spring latching hooks which snap into the tubular piece 17. The projection 18, which is in the form of a bead, then rests on the annular sealing element 16, ensuring that it is seated to form a seal by virtue of the surface pressure provided by the spring clamping hooks 12.

Figure 6:
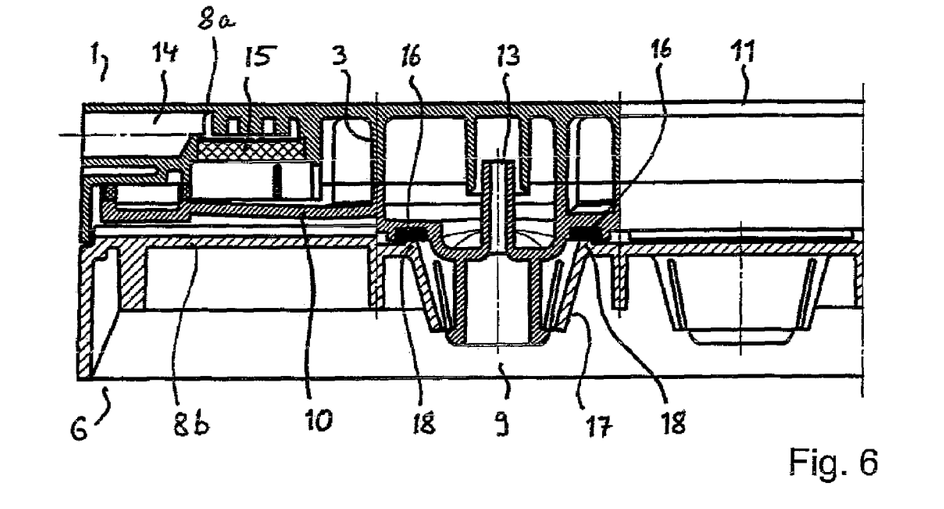
FIG. 6 shows a partial longitudinal section through the accumulator shown in FIG. 2, with a degassing channel system fitted.

FIG. 6 shows a longitudinal section view through the accumulator 6 with a degassing channel system 1 fitted. As can be seen, the annular sealing elements 16, which are preferably flexible, are pressed firmly against the projections 18, which are in the form of beads, thus ensuring that the opening 9 is sealed from the surrounding external area. The cell vessels are thus open only via the degassing valves 13 in the direction of the cavity in the degassing channel system 1. The deflection webs 3 keep the electrolyte away from the ignition protection element 15, and gas can flow outwards into the surrounding area through the ignition protection element 15 and through the gas dissipation channel 14.

Figure 7:
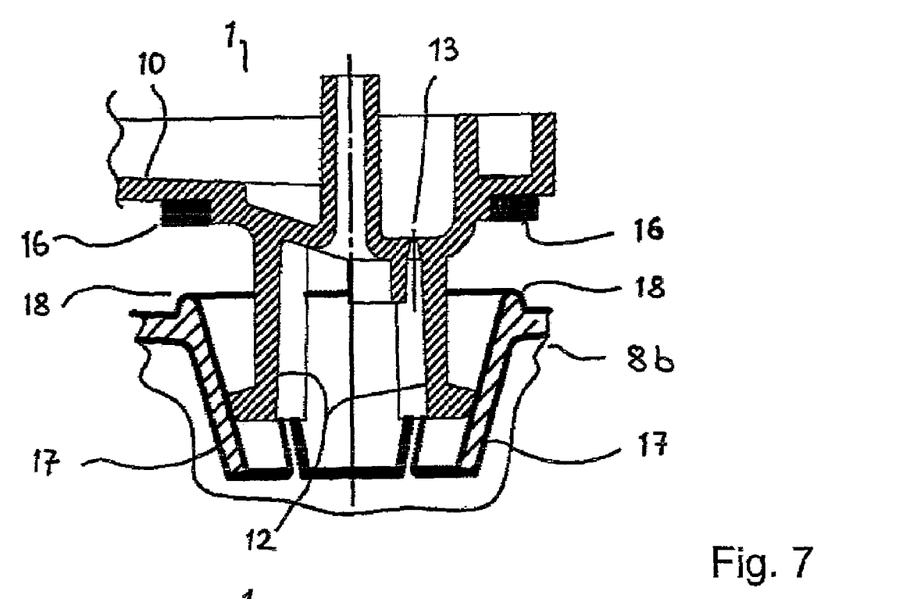
FIG. 7 shows a section view of a detail of the degassing channel system and a seal surrounding a degassing opening on the lower part of the degassing channel system, and a projection on the lower cover of the accumulator.

FIG. 7 shows a section view of a detail in which spring snap-action hooks 12 which are surrounded by its opening 9 and project downwards are partially inserted into the tubular piece 17 of the lower cover 8b. Once the degassing channel system 1 has been plugged completely onto the lower cover 8b, the vanes of the spring snap-action hooks 12 lock at the lower end on the lower edge of the tubular piece 17.

As can be seen, degassing valves 13 are provided in the direction of the cavity in the degassing channel system 1 in the opening 9, in order as far as possible to retain sloshing electrolyte in the cell, even when the accumulator is tilted, while nevertheless allowing gas that has been released to escape.

In the illustrated embodiment, a projection 18 is provided, which is in the form of a bead and surrounds the opening 9 in the lower cover 6 in the form of an annulus. A corresponding annular flexible sealing element 16 is arranged on the lower face of the lower cover, is pressed against the projection 18, which is in the form of a bead, and seals the opening 9 together with the projection 18, which is in the form of a bead, when the degassing channel system 1 is firmly seated on the lower cover 8b.

Figure 8:
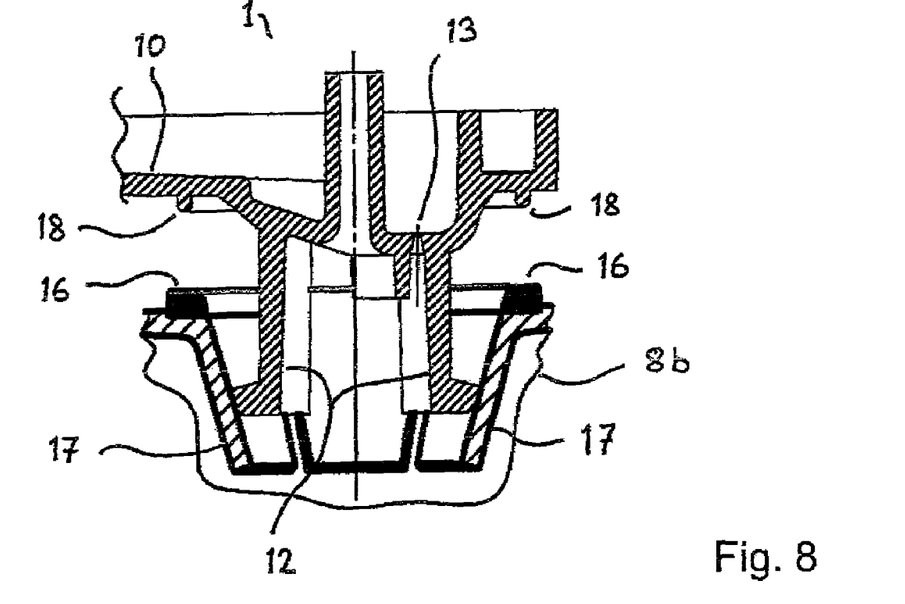
FIG. 8 shows a section view of a detail of the degassing channel system and a projection surrounding a degassing opening on the upper part of the degassing channel system, and a seal on the lower cover of the accumulator.

FIG. 8 shows an embodiment that has been slightly modified from that shown in FIG. 7. The only difference is that the annular sealing element 16 is arranged on the upper face of the lower cover 8b and interacts with a projection 18 which is in the form of a bead, extends in the form of an annulus on the lower face of the lower part 10 of the degassing channel system 1 and whose radius is preferably chosen such that it corresponds to the mean radius of the annular sealing element 16.

Figure 9:
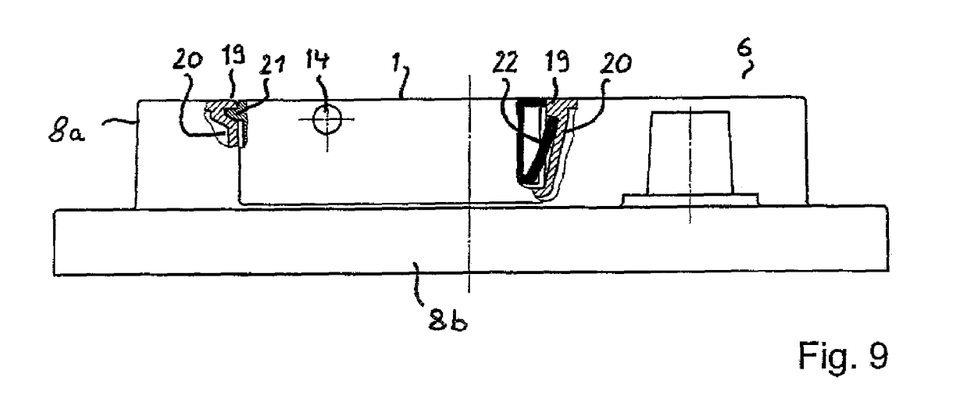

FIG. 9 shows a second embodiment of the accumulator 6, in which locking tabs 19 are provided on walls 20 which project upwards away from the cell vessels from the lower cover 8b. The degassing channel system 1 has latching tabs 21 or spring snap-action hooks 22 which correspond to the locking tabs 19, in order to press the degassing channel system 1 with adequate surface pressure against the projections 18, which are in the form of beads, and are provided there, in the area of the openings. The degassing channel system 1 is in this case simply inserted into the trough (which is formed by the walls 20) on the accumulator 6, and is locked there.

Figure 10:
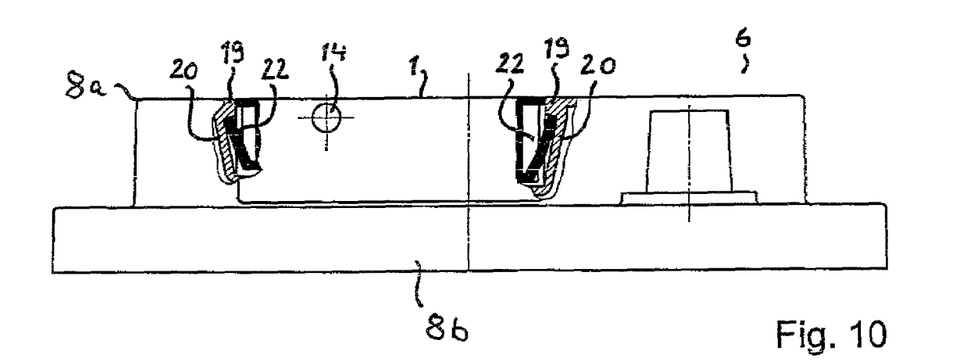

FIG. 10 shows a third embodiment of the accumulator 6, in which locking tabs 19 are provided on both attachment sides on the walls 20 which project upwards away from the cell vessels from the lower cover 8b. Spring snap-action hooks 22 which interact with the locking tabs 19 are provided adjacent to the locking tabs 19 on the side edges of the degassing channel system 1 and, by virtue of their spring force which is directed outwards away from the side edge of the degassing channel system 1, latch the springs under the locking tabs 19 when the degassing channel system 1 is plugged into the trough of the accumulator cover, that is to say, between the walls 20.

FIGS. 9 and 10 also show the gas, which emerges at the side from the degassing channel system 1, from the dissipation channel 14.

It should be noted that references to relative positions (e.g., "top" and "bottom") in this description are merely used to identify various elements as are oriented in the FIGURES. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the accumulator or battery as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may be made in the design, operating conditions and arrangement of the various exemplary embodiments without departing from the scope of the present inventions as expressed in the appended claims.

What is claimed is:

1. A battery comprising a housing having a plurality of cell vessels and a plurality of positive and negative electrode plates provided within the cell vessels, the battery comprising:
    a cover configured to close the cell vessels with a seal, the cover having openings for the cell vessels;
    a degassing channel system which is coupled to the cover by at least one member, the openings of the cover opening into the degassing channel system;
    annular projections integrally formed on each of the openings of the cover adjacent to the cover; and
    annular sealing elements provided on the degassing channel system;
    wherein the at least one member is configured to couple the degassing channel system to the cover such that the projections engage the sealing elements to seal the openings to the degassing channel system by surface pressure.

2. The battery of claim 1, wherein the sealing elements surround the at least one member.

3. The battery of claim 1, wherein the projections are provided in the form of beads.

4. The battery of claim 1, wherein the sealing elements are flexible sealing rings.

5. The battery of claim 1, wherein the sealing elements are molded on using a two-component process.

6. The battery of claim 1, wherein the degassing channel system has a cavity between a base and an upper cover, and deflection webs which form the degassing channel system are arranged between the base and the upper cover.

7. The battery of claim 6, wherein the at least one member comprises a spring snap-action hook which extends downwards from the cavity on the base of the degassing channel system to engage a feature of the cover, the spring snap-action hook having a length that is configured such that when the degassing channel system is coupled to the cover, the spring snap-action hook locks with the cover to ensure surface pressure which is sufficient to seal the opening.

8. The battery of claim 7, wherein the feature comprises an opening in the cover.

9. The battery of claim 1, wherein the openings in the cover have tubular connecting studs which project inwards into the cell vessels.

10. The battery of claim 1, further comprising walls which extend upwards from the cell vessels.

11. The battery of claim 10, wherein the walls comprise at least one of locking tabs and latching grooves for coupling the degassing channel system to the cover.

12. The battery claim 11, wherein the degassing channel system is coupled to the cover by at least one of spring snap-action hooks and guide tabs that are configured to engage the locking tabs or latching grooves.

\* \* \* \* \*